(12) United States Patent
Shenoy et al.

(10) Patent No.: US 9,769,588 B2
(45) Date of Patent: Sep. 19, 2017

(54) SPATIAL AUDIO ENHANCEMENT APPARATUS

(71) Applicant: Nokia Technologies Oy, Espoo (FI)

(72) Inventors: Ravi Shenoy, Bangalore (IN); Pushkar Prasad Patwardhan, Maharashtra (IN); Gururaj Gopal Putraya, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/441,322

(22) PCT Filed: Nov. 18, 2013

(86) PCT No.: PCT/FI2013/051077
§ 371 (c)(1),
(2) Date: May 7, 2015

(87) PCT Pub. No.: WO2014/080074
PCT Pub. Date: May 30, 2014

(65) Prior Publication Data
US 2015/0296319 A1  Oct. 15, 2015

(30) Foreign Application Priority Data
Nov. 20, 2012  (IN) .......................... 4846/CHE/2012

(51) Int. Cl.
*H04R 5/02* (2006.01)
*H04S 7/00* (2006.01)
(Continued)

(52) U.S. Cl.
CPC ............. *H04S 7/302* (2013.01); *G06T 7/557* (2017.01); *H04M 3/568* (2013.01); *H04R 3/005* (2013.01); *G10L 2021/02166* (2013.01); *H04N 7/15* (2013.01); *H04S 2400/11* (2013.01); *H04S 2400/13* (2013.01); *H04S 2400/15* (2013.01); *H04S 2420/01* (2013.01)

(58) Field of Classification Search
CPC ...... H04N 7/15; H04N 7/141; H04N 13/0059; H04N 19/167; H04L 65/403
USPC .................... 381/306, 310; 348/14.08, 14.16
See application file for complete search history.

(56) References Cited

U.S. PATENT DOCUMENTS

| 6,157,403 A * | 12/2000 | Nagata | .................... G01S 15/46 348/171 |
| 2008/0218586 A1 * | 9/2008 | Graham | .............. H04L 12/1822 348/14.09 |

(Continued)

OTHER PUBLICATIONS

International Search Report and Written Opinion received for corresponding Patent Cooperation Treaty Application No. PCT/FI2013/051077, dated , 20 pages.

*Primary Examiner* — Alexander Jamal
(74) *Attorney, Agent, or Firm* — Harrington & Smith

(57) ABSTRACT

An apparatus comprising: a depth map estimator configured to determine, associated with at least one visual image, a depth map comprising at least one distance value in a direction relative to an apparatus; a direction of arrival estimator configured to determine, using at least two microphones, at least one audio source signal with a direction; and an audio signal processor configured to process the at least one audio source signal based on the at least one distance value in the direction of the at least one audio source signal.

20 Claims, 12 Drawing Sheets

(51) Int. Cl.
*H04M 3/56* (2006.01)
*H04R 3/00* (2006.01)
*G06T 7/557* (2017.01)
*H04N 7/15* (2006.01)
*G10L 21/0216* (2013.01)

(56) References Cited

U.S. PATENT DOCUMENTS

| | | |
|---|---|---|
| 2010/0166055 A1* | 7/2010 | Schmit ................ H04N 19/176 |
| | | 375/240.01 |
| 2011/0038229 A1 | 2/2011 | Beaucoup |
| 2011/0085061 A1 | 4/2011 | Kim |
| 2011/0135102 A1 | 6/2011 | Huang et al. |
| 2011/0164769 A1 | 7/2011 | Zhan et al. |
| 2011/0243336 A1 | 10/2011 | Nakano |
| 2012/0046101 A1 | 2/2012 | Marks et al. |
| 2012/0076304 A1 | 3/2012 | Suzuki |

* cited by examiner

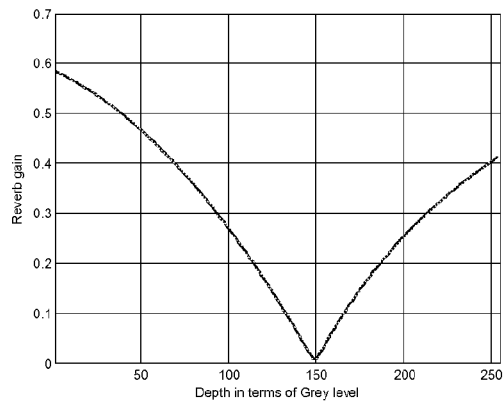
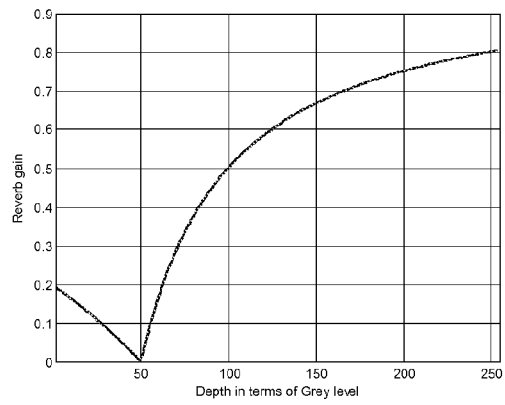
Figure 10                               Figure 11

SPATIAL AUDIO ENHANCEMENT APPARATUS

RELATED APPLICATION

This application was originally filed as Patent Cooperation Treaty Application No. PCT/FI2013/051077 filed Nov. 18, 2013 which claims priority benefit to Indian Patent Application No. 4846/CHE/2012, filed Nov. 20, 2012.

FIELD

The present invention relates to a providing additional functionality for spatial audio processing. The invention further relates to, but is not limited to spatial audio processing in mobile devices.

BACKGROUND

Mobile devices or apparatus such as mobile phones are becoming equipped with greater number of sensors such as microphones or cameras that enable the user of the apparatus or device to perform a much greater range of operations. For example mobile apparatus or devices can be equipped with a cluster of microphones (otherwise known as an array of microphones) which can be used to perform source separation to extract individual audio sources from the sound field surrounding the apparatus. The operation of source separation produces an estimate of the independent or uncorrelated sources. Alternatively using the array of microphones beamforming, an audio signal processing technique, can be used to improve the signal to interference ratio of these directional sources.

These individual sources are often re-synthesised for playback on headphones or loudspeaker sets. Typically the direction of arrival for each of the sources is estimated. A binaural synthesis on each of the sources can be performed based on the directional of arrival (DOA). The binaural output of different sources can then be added together to create a binaural rendition or representation of the sound field. Similar synthesis can also be performed for multi-loudspeaker playback.

Mobile devices are furthermore often being equipped with a camera and in some cases more than one camera in order to generate three-dimensional image data that can be viewed. These array camera-based devices (such as apparatus comprising two cameras or a camera and a depth sensor) can be used to estimate a depth map for the field of view. The accuracy of the depth map can be coarse or fine depending on the type of sensors used and the resolution of the sensors. The depth map is often used to synthesise 3-D images or perform refocusing, however the usage of depth information is often limited to image rendering.

STATEMENT

According to an aspect, there is provided a method comprising: determining, associated with at least one visual image, a depth map comprising at least one distance value in a direction relative to an apparatus; determining, using at least two microphones, at least one audio source signal with a direction; and processing the at least one audio source signal based on the at least one distance value in the direction of the at least one audio source signal.

Determining a depth map may comprise at least one of: determining a depth map from at least two images offset relative to each other; determining a depth map from a depth sensor and at least one image; and determining a depth map from a lightfield camera.

Determining at least one audio source signal with a direction may comprise: receiving at least two audio signals from at least two microphones offset relative to each other; determining based on the at least two audio signals at least one audio source, and a direction of the at least one audio source; and generating based on the at least one audio source and the at least one audio source direction the at least one audio source signal with a direction.

Processing the at least one audio source signal based on the distance value in the direction of the at least one audio signal may comprise at least one of: filtering the at least one audio source signal based on the distance value; amplifying the at least one audio source signal based on the distance value; attenuating the at least one audio source signal based on the distance value; parametrically filtering the at least one audio source signal based on the distance value; non-parametrically filtering the at least one audio source signal based on the distance value; pitch shifting the at least one audio source signal based on the distance value; time varying processing the at least one audio source signal based on the distance value; non-linear processing of the at least one audio source signal based on the distance value; and reverberation processing the at least one audio source signal based on the distance value.

The direction may comprise a range of direction values.

Determining, associated with at least one visual image, a depth map comprising at least one distance value in a direction relative to the apparatus may comprise determining a plurality of distance values in directions relative to the apparatus; determining, using at least two microphones, at least one audio source signal with a direction may comprise determining a plurality of audio source signals with directions; and processing the at least one audio source signal based on the at least one distance value in the direction of the at least one audio source signal may comprise processing each of the plurality of audio source signals with directions based on the at least one distance value in the direction of each audio source signal.

The method may further comprise synthesising a multi-channel audio signal from the at least one audio source signal processed based on the at least one distance value in the direction of the at least one audio source signal.

The method may further comprise combining the multi-channel audio signals synthesised from each of the processed plurality of audio source signals.

The at least one audio source signal with a direction relative to the apparatus may be associated with a feature within the at least one visual image, the feature may be located at the distance value in the direction relative to the apparatus, the method may further comprise optically processing the feature.

Optically processing the feature may comprise optically focussing at the distance value, and optically defocusing for other distance values.

The method may further comprise: displaying on a display the at least one visual image; and wherein processing the at least one audio source signal based on the at least one distance value in the direction of the at least one audio source signal may comprise: selecting on the at least one visual image on the display the direction relative to an apparatus; and processing the at least one audio source signal in the selected direction.

According to a second aspect there is provided an apparatus comprising at least one processor and at least one memory including computer code for one or more programs, the at least one memory and the computer code configured to with the at least one processor cause the apparatus to at least: determine, associated with at least one visual image, a depth map comprising at least one distance value in a direction relative to an apparatus; determine, using at least two microphones, at least one audio source signal with a direction; and process the at least one audio source signal based on the at least one distance value in the direction of the at least one audio source signal.

Determining a depth map may cause the apparatus to at least one of: determine a depth map from at least two images offset relative to each other; determine a depth map from a depth sensor and at least one image; and determine a depth map from a lightfield camera.

Determining at least one audio source signal with a direction may cause the apparatus to: receive at least two audio signals from at least two microphones offset relative to each other; determine based on the at least two audio signals at least one audio source, and a direction of the at least one audio source; and generate based on the at least one audio source and the at least one audio source direction the at least one audio source signal with a direction.

Processing the at least one audio source signal based on the distance value in the direction of the at least one audio signal may cause the apparatus to at least one of: filter the at least one audio source signal based on the distance value; amplify the at least one audio source signal based on the distance value; attenuate the at least one audio source signal based on the distance value; parametrically filter the at least one audio source signal based on the distance value; non-parametrically filter the at least one audio source signal based on the distance value; pitch shift the at least one audio source signal based on the distance value; time varying process the at least one audio source signal based on the distance value; non-linear process the at least one audio source signal based on the distance value; and reverberation process the at least one audio source signal based on the distance value.

The direction may comprise a range of direction values.

Determining, associated with at least one visual image, a depth map comprising at least one distance value in a direction relative to the apparatus may cause the apparatus to: determine a plurality of distance values in directions relative to the apparatus and determining, using at least two microphones, at least one audio source signal with a direction may cause the apparatus to determine a plurality of audio source signals with directions; and processing the at least one audio source signal based on the at least one distance value in the direction of the at least one audio source signal may cause the apparatus to process each of the plurality of audio source signals with directions based on the at least one distance value in the direction of each audio source signal.

The apparatus may be further caused to synthesize a multichannel audio signal from the at least one audio source signal processed based on the at least one distance value in the direction of the at least one audio source signal.

The apparatus may further be caused to combine the multichannel audio signals synthesised from each of the processed plurality of audio source signals.

The at least one audio source signal with a direction relative to the apparatus may be associated with a feature within the at least one visual image, the feature may be located at the distance value in the direction relative to the apparatus, the apparatus may be further caused to optically process the feature.

Optically processing the feature may cause the apparatus to optically focus at the distance value, and optically defocus for other distance values.

The apparatus may further be caused to: display on a display the at least one visual image; and wherein processing the at least one audio source signal based on the at least one distance value in the direction of the at least one audio source signal may cause the apparatus to: select on the at least one visual image on the display the direction relative to the apparatus; and process the at least one audio source signal in the selected direction.

According to a third aspect there is provided an apparatus comprising: means for determining, associated with at least one visual image, a depth map comprising at least one distance value in a direction relative to an apparatus; means for determining, using at least two microphones, at least one audio source signal with a direction; and means for processing the at least one audio source signal based on the at least one distance value in the direction of the at least one audio source signal.

The means for determining a depth map may comprise at least one of: means for determining a depth map from at least two images offset relative to each other; means for determining a depth map from a depth sensor and at least one image; and means for determining a depth map from a lightfield camera.

The means for determining at least one audio source signal with a direction may comprise: means for receiving at least two audio signals from at least two microphones offset relative to each other; means for determining based on the at least two audio signals at least one audio source, and a direction of the at least one audio source; and means for generating based on the at least one audio source and the at least one audio source direction the at least one audio source signal with a direction.

The means for processing the at least one audio source signal based on the distance value in the direction of the at least one audio signal may comprise at least one of: means for filtering the at least one audio source signal based on the distance value; means for amplifying the at least one audio source signal based on the distance value; means for attenuating the at least one audio source signal based on the distance value; means for parametrically filtering the at least one audio source signal based on the distance value; means for non-parametrically filtering the at least one audio source signal based on the distance value; means for pitch shifting the at least one audio source signal based on the distance value; means for time varying processing the at least one audio source signal based on the distance value; means for non-linear processing of the at least one audio source signal based on the distance value; and means for reverberation processing the at least one audio source signal based on the distance value.

The direction may comprise a range of direction values.

The means for determining, associated with at least one visual image, a depth map comprising at least one distance value in a direction relative to the apparatus may comprise means for determining a plurality of distance values in directions relative to the apparatus; the means for determining, using at least two microphones, at least one audio source signal with a direction may comprise means for determining a plurality of audio source signals with directions; and the means for processing the at least one audio source signal based on the at least one distance value in the direction of the at least one audio source signal may comprise means for processing each of the plurality of audio source signals with directions based on the at least one distance value in the direction of each audio source signal.

The apparatus may further comprise means for synthesising a multichannel audio signal from the at least one audio source signal processed based on the at least one distance value in the direction of the at least one audio source signal.

The apparatus may further comprise means for combining the multichannel audio signals synthesised from each of the processed plurality of audio source signals.

The at least one audio source signal with a direction relative to the apparatus may be associated with a feature within the at least one visual image, the feature may be located at the distance value in the direction relative to the apparatus, the apparatus may further comprise means for optically processing the feature.

The means for optically processing the feature may comprise means for optically focussing at the distance value, and means for optically defocusing for other distance values.

The apparatus may further comprise: means for displaying on a display the at least one visual image; and wherein the means for processing the at least one audio source signal based on the at least one distance value in the direction of the at least one audio source signal may comprise: means for selecting on the at least one visual image on the display the direction relative to the apparatus; and means for processing the at least one audio source signal in the selected direction.

According to a fourth aspect there is provided an apparatus comprising: a depth map estimator configured to determine, associated with at least one visual image, a depth map comprising at least one distance value in a direction relative to an apparatus; a direction of arrival estimator configured to determine, using at least two microphones, at least one audio source signal with a direction; and an audio signal processor configured to process the at least one audio source signal based on the at least one distance value in the direction of the at least one audio source signal.

The depth map estimator may be configured to determine at least one of: a depth map from at least two images offset relative to each other; a depth map from a depth sensor and at least one image; and a depth map from a lightfield camera.

the direction of arrival estimator may comprise: an input configured to receive at least two audio signals from at least two microphones offset relative to each other; an audio source determiner configured to determine based on the at least two audio signals at least one audio source; an audio source direction determiner a direction of the at least one audio source; and a source separator configured to generate based on the at least one audio source and the at least one audio source direction the at least one audio source signal with a direction.

The audio signal processor may comprise at least one of: a filter configured to filter the at least one audio source signal based on the distance value; an amplifier configured to amplify the at least one audio source signal based on the distance value; an attenuator configured to attenuate the at least one audio source signal based on the distance value; a parametric filter configured to parametrically filter the at least one audio source signal based on the distance value; a non-parametric filter configured to non-parametrically filter the at least one audio source signal based on the distance value; a pitch shifter configured to pitch shift the at least one audio source signal based on the distance value; a time varying processor configured to time varying process the at least one audio source signal based on the distance value; a non-linear processor configured to non-linear process the at least one audio source signal based on the distance value; and reverberation processor configured to reverberation process the at least one audio source signal based on the distance value.

The direction may comprise a range of direction values.

The depth map estimator may be configured to determine a plurality of distance values in directions relative to the apparatus; the direction of arrival determiner may be configured to determine a plurality of audio source signals with directions; and the audio signal processor may be configured to process each of the plurality of audio source signals with directions based on the at least one distance value in the direction of each audio source signal.

The apparatus may comprise an audio synthesiser configured to synthesise a multichannel audio signal from the at least one audio source signal processed based on the at least one distance value in the direction of the at least one audio source signal.

The apparatus may further comprise a combiner configured to combine the multichannel audio signals synthesised from each of the processed plurality of audio source signals.

The at least one audio source signal with a direction relative to the apparatus may be associated with a feature within the at least one visual image, the feature may be located at the distance value in the direction relative to the apparatus, the apparatus may further comprise a visual image processor configured to optically process the feature.

The visual image processor may be configured to optically focus at the distance value, and optically defocus for other distance values.

The apparatus may further comprise: a display configured to display the at least one visual image; and wherein the audio processor may be configured to: receive a selection input from the at least one visual image on the display of a direction relative to the apparatus; and process the at least one audio source signal in the selected direction.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which:

FIGS. 10 and 11 show example gain on reverberation as a function of depth graphs.

DESCRIPTION OF EXAMPLE EMBODIMENTS

The concept of embodiments of the application is to enable the application of the array camera depth information to an estimated audio source sound field to produce an estimate of the audio depth map. Estimating the audio depth map at the moment is a challenging and as yet not completely solved problem. There are several techniques to estimate the audio depth however these have limitations. For example using multiple sets of microphone arrays which are separated by sufficient distance so as to be able to perform audio triangulation required an array separation which is incompatible with the design ethos of mobile devices. In other words the microphone arrays are too large to be mounted on mobile apparatus such as mobile phones. Another known technique is the near field 'acoustic camera'. The near field 'acoustic camera' can provide audio depth estimation for sources in the near field but produces poor and unacceptable results for sources in the far field.

The concept therefore relates to an apparatus and method for interacting with the directionality of audio signals (without an accompanying audio depth map) and at least one user interface element of the displayed image based on the visual depth information where the visual depth is provided by either a plurality of image sensors or an array camera and or plenoptic camera or a depth sensor (such as an infrared sensor) or a combination thereof. The concept as described herein thus features directionality referred to as the direction of arrival (DOA) of audio wave fronts from various sources and the visual depth referred to relative distances between two objects from the image/depth sensor normalized by the focal length. This depth could be mapped to true depths such as meters using a pre-calibrated mapping function.

The concept therefore provides a new use case where the user of such an apparatus can focus both visual and or audio objects within the 'field of view' or field of experience postcapture. For example during a video conferencing application a remote listener can focus on a particular talker or audio source both in terms of the image focus and audio focus and the remaining talkers are image and audio defocused.

Figure 1:
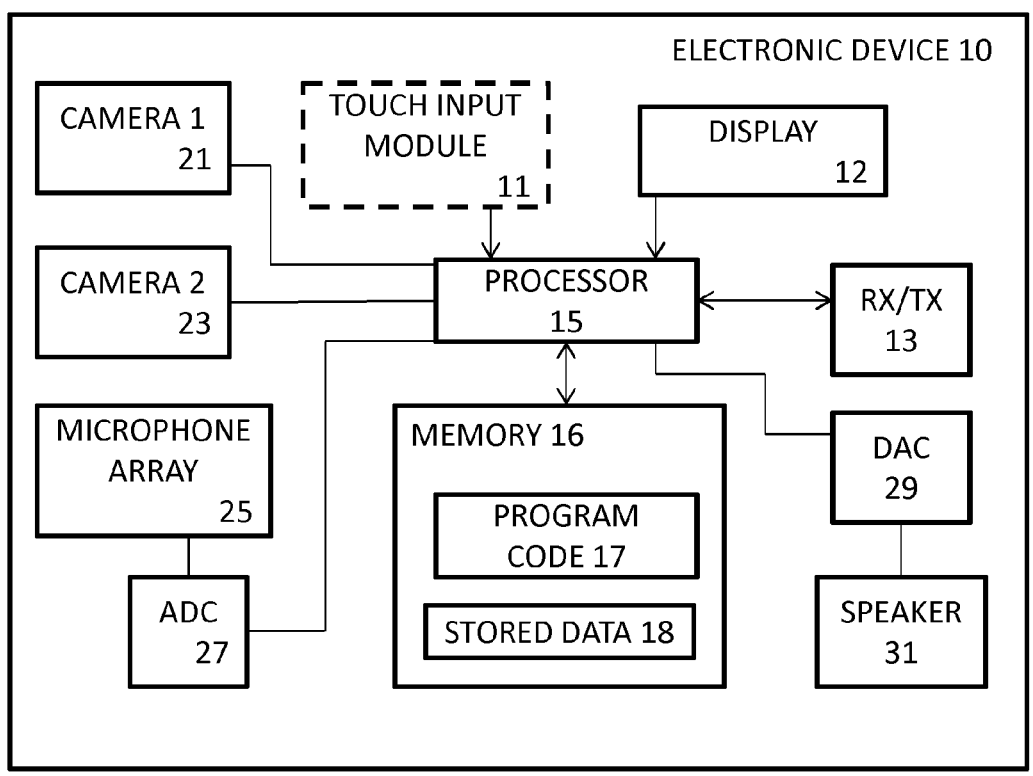
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved image experiences.

The apparatus 10 is in some embodiments a mobile terminal, mobile phone or user equipment for operation in a wireless communication system. In other embodiments, the apparatus is any suitable electronic device configured to process video and audio data. In some embodiments the apparatus is configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as audio signal processing, audio source separation, beamforming of audio signals, visual depth map determining, and image data processing. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The touch input module as described here is an example of a user interface input. It would be understood that in some other embodiments any other suitable user interface input can be employed to provide an user interface input, for example to select an item, object, or region from a displayed screen. In some embodiments the user interface input can thus be a keyboard, mouse, keypad, joystick or any suitable pointer device.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electrophoretic displays (also known as electronic paper, e-paper or electronic ink displays). In some embodiments the display 12 employs one of the display technologies projected using a light guide to the display window.

In some embodiments the apparatus comprises a camera 21, 23. In the example shown in FIG. 1 the apparatus comprises a first camera, camera 1, 21 and a second camera, camera 2, 23. The camera 21, 23 can be any suitable video or image capturing apparatus. The camera 21, 23 can be configured to capture images and pass the image or video data to the processor 15. Furthermore in some embodiments at least one camera can be implemented as a non-visual radiation range detector. For example at least one of the 'cameras' can be an infra-red range detector configured to determine a distance from the apparatus to an object.

Furthermore in some embodiments the apparatus comprises a microphone array 25 comprising at least two microphones. The microphones or array of microphones can be solid state microphones, in other words capable of capturing audio signals and outputting a suitable digital format signal. In some other embodiments the microphone or array of microphones 25 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphones or array of microphones 25 can in some embodiments output the audio captured signal to an analogue-to-digital converter (ADC) 27.

In some embodiments the apparatus can further comprise an analogue-to-digital converter (ADC) 27 configured to receive the analogue captured audio signal from the microphones and outputting the audio captured signal in a suitable digital form. The analogue-to-digital converter 27 can be any suitable analogue-to-digital conversion or processing means.

In some embodiments the apparatus further comprises a digital-to-analogue converter (DAC) 29 for converting digital audio signals from a processor 15 to a suitable analogue format. The digital-to-analogue converter (DAC) or signal processing means 29 can in some embodiments be any suitable DAC technology.

Furthermore the apparatus can comprise in some embodiments a speaker 31. The speaker 31 can in some embodiments receive the output from the digital-to-analogue converter 29 and present the analogue audio signal to the user. In some embodiments the speaker 31 can be representative of a headset, for example a set of headphones, or cordless headphones.

Figure 2:
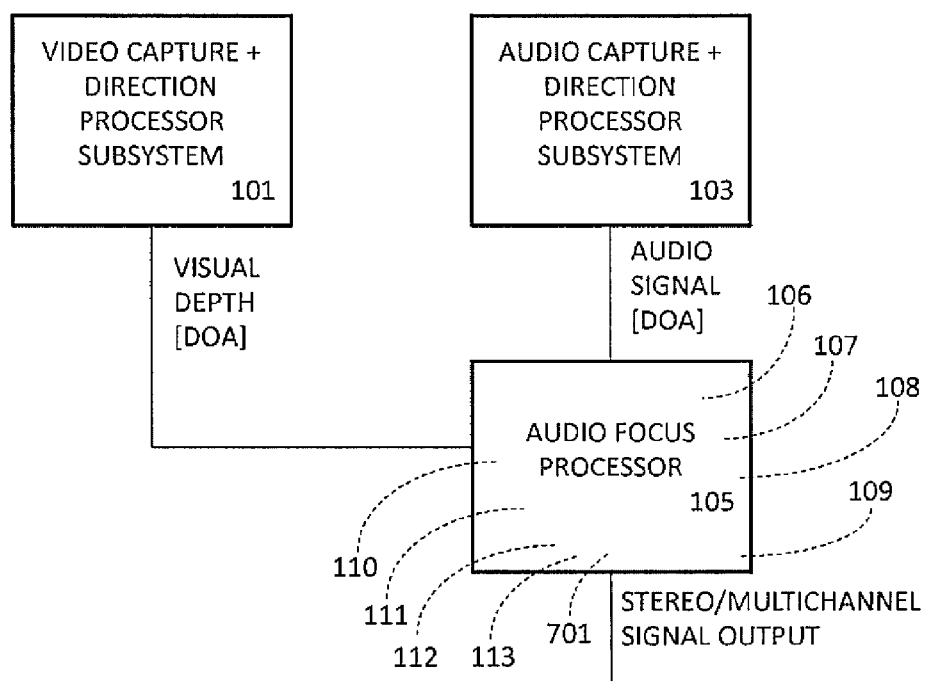
FIG. 2 shows schematically an audio depth focuser according to some embodiments.

With respect to FIG. 2 an example audio depth focuser is shown according to some embodiments. The audio depth focuser in some embodiments comprises a video capture and direction processor subsystem 101. The video capture and direction processor subsystem 101 is configured to capture images from the apparatus and process this image data in such a manner that the output of the video capture and direction processor subsystem 101 is a visual depth map. In other words the output is a function of the visual depth measurements against the direction of arrival (DOA) of the image element.

The visual depth map can be output to the audio focus processor 105.

Figure 7A:
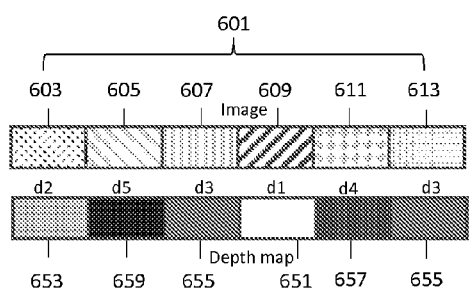
FIGS. 7a and 7b show example image element depth mapping for direction of arrival for the video capture and direction processor subsystem.
Figure 7B:
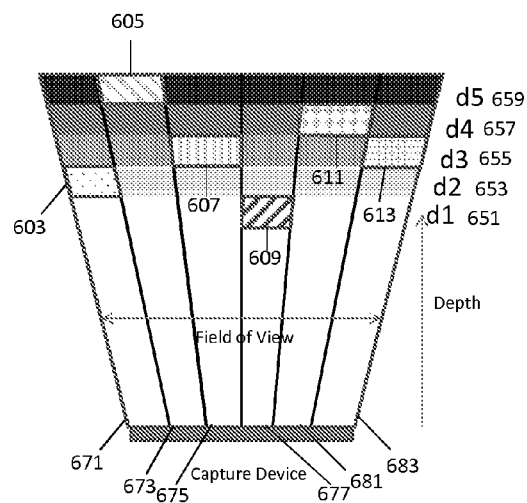

With respect to FIGS. 7a and 7b example depth maps for an image output is shown. In the examples shown in FIGS. 7a and 7b the image output is a single row of pixels, however it would be understood that the depth map can comprise more than one row of pixels or regions. For example FIG. 7a shows a one-dimensional array 601 of image data rectangles or regions and associated depth mapping for each rectangle in the array of rectangles 601. In some embodiments each of the rectangles can represent a pixel (for a fine depth map) or region of pixels (in a coarse depth map). The array 601 of pixels as shown in FIGS. 7a and 7b comprises a first pixel 603, a second pixel 605, a third pixel 607, a fourth pixel 609, a fifth pixel 611 and a 6th pixel 613. Each of these pixels has an associated depth map shown in terms of the grey value rectangle underneath the pixel shown in FIG. 7a. The most distant objects are shown mapped in black and closer objects are shown in lighter shades of grey with increasing brightness. In the examples it can be seen that the third pixel 607 has a depth d3 655 and the sixth region 613 also has depth d3 655. The first pixel 603 has an associated depth d2 653, the second pixel 605 an associated depth d5 659, the fourth pixel 609 an associated depth d1 651 and the fifth pixel an associated depth d4 657.

With respect to FIG. 7b the pixels are shown mapped onto a single view with respect to the capture device. The pixels show a full field of view which is separated or divided into a range of direction of arrival (DOA) divisions or regions. For example the first pixel 603 represents a first direction of arrival region 671, the second pixel 605 a second direction of arrival region 673, the third pixel 607 represents a third direction of arrival region 675, the fourth pixel 609 represents a fourth direction of arrival region 677, the fifth pixel 611 represents a fifth direction of arrival region 681, and the sixth pixel 613 represents the sixth direction of arrival region 683. Furthermore FIG. 7b shows the five different depths d1 651 (the closest) to d5 659 (the furthest) of each of the pixels with respect to their direction of arrival.

The audio depth focuser in some embodiments comprises an audio capture and direction processor subsystem 103. The audio capture and direction processor subsystem 103 can be configured to record or capture the audio signals from the audio scene within which the apparatus is operating and process these audio signals to separate out audio sources and determine or estimate direction components of the audio sources. In some embodiments the audio capture and direction processor subsystem 103 is configured to process the audio signals separating the audio signal into the source direction of arrival (DOA) regions. The audio capture and direction processor subsystem 103 in such embodiments is configured to output audio signals defined by the direction of arrival and pass these values to the audio focus processor 105.

In some embodiments the audio depth focuser comprises an audio focus processor 105 configured to receive audio signals defined by the direction of arrival and furthermore the visual depth map defined also by the direction of arrival. The audio focus processor 105 can then be configured to process the audio signal based on or dependent on the visual depth map. In other words the audio signals for the particular direction of arrival region can be processed according to the value of the depth from the visual depth map in that region.

In some embodiments in order to impart the perception of depth in audio various types of processing can be performed. For example in some embodiments linear processing such as filtering or reverberation processing on the audio signals can be performed, however in some embodiments nonlinear processing such as doppler or pitch shifting or range compression of the audio signal can also be performed based on the direction of arrival information from the visual depth map.

In the following described examples depth based refocusing in video applications applied to the audio signal are discussed in detail however the application of other audio signal processing based on the video depth map is similar to that described herein.

In the refocusing example the interest is to create a feeling of blurring at different depths both in visual and audio rendition. In such embodiments a visual feed or image where each and every object is in focus (for example obtained from an extended depth of focus imaging system) is processed so that different amounts of blurring can be applied to different regions according to their depth. The result of this depth based blurring can be thus that only the object and the desired depth can be rendered to be in focus and objects nearer or further away are shown as being out of focused or blurred. The degree of blurring depends on the relative depth compared to the depth of the reference object that is in focus.

A similar effect can be applied by the audio focus processor 105 to the audio signal by applying reverberation and therefore the effect of blurring can be controlled by having different parameters in the reverberation filter and controlling the ratio of direct to reverb signal output from the filter.

The concept operations as shown in FIG. 2 can therefore be summarized as the following steps.

Estimate the source signals arriving from various direction of arrival within the field of view.

Get the depth from the array camera(s)

Associate the depth to azimuth (DOA) direction for each group of columns (using a mean or median depth)

Based on the depth for each and every azimuth (DOA) range, filter the signals using a kernel. The filter characteristics are controlled by the depth for each direction of arrival. The kernel can be parametric or nonparametric. As an example the parametric filter can be reverberation. Reverberation is typically implemented as filter (FIR or IIR). The characteristics of this filter, for example the T60 time, can be controlled by changing the coefficients of the filter. The parameters can be based on depth.

Imparting perception of depth in audio can be further controlled by changing the gain according to the difference in depth between an azimuth for an object in focus and the azimuth being processed.

Figure 3:
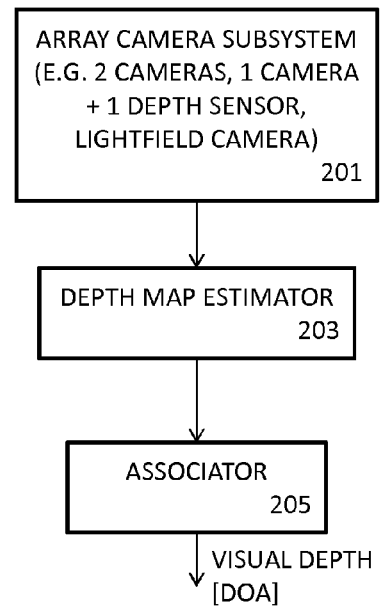
FIG. 3 shows schematically a video capture and direction processor subsystem as shown in FIG. 2 according to some embodiments.

With respect to FIG. 3 an example video capture and direction processor subsystem 101 is shown in further detail. Furthermore with respect to FIG. 4 the operation of the example video capture and direction processor subsystem is described.

The video capture and direction processor subsystem 101 can in some embodiments comprise the array camera subsystem 201. For example the array camera subsystem 201 can comprises two cameras such as shown in FIG. 1 by camera 1 21 and camera 2 22, or in some embodiments the array camera subsystem can comprise any combination of camera, depth sensor or lightfield camera.

The array camera subsystem 201 can be configured to capture or record images and image data and pass these to a depth map estimator 203.

Figure 4:
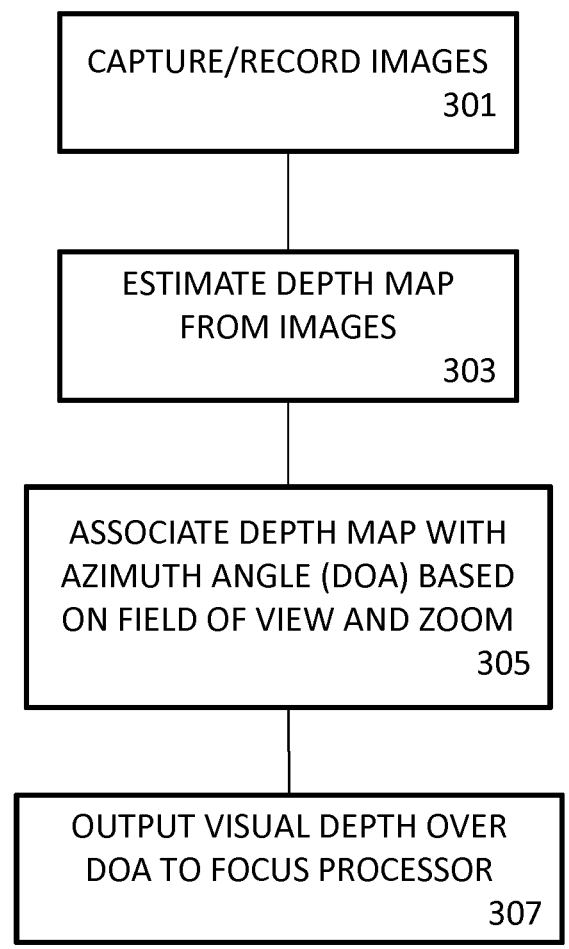
FIG. 4 shows a flow diagram of the operation of the video capture and direction processor subsystem as shown in FIG. 2 according to some embodiments.

The operation of capturing or recording these pages is shown in FIG. 4 by step 301.

In some embodiments the video capture and direction processor subsystem 101 comprises a depth map estimator or suitable means 203. The depth map estimator 203 can be configured to receive the image and image data from the array camera subsystem 201 and generate an estimated depth map from the image data.

Any suitable means or method for generating the visual depth map can be used. For example in some embodiments a pair of cameras separated by a known distance (or baseline) can generate a suitable mapping where the difference in images produced by the camera enable an estimation of the distance from the apparatus to be determined. In some embodiments the camera image is supplemented by a suitable depth sensor or lightfield camera to associate the depth values with image data from the camera.

The depth map estimator can then be configured to output to an associator 205 the estimated depth map values.

The operation of estimating the depth map from the images is shown in FIG. 4 by step 303.

In some embodiments the video capture and direction processor subsystem 101 comprises an associator or suitable means for associating 205. The associator is configured to receive the depth map estimated in data and in some embodiments the field of view and zoom factors regarding the camera(s) and from this information generate a suitable association of the depth map with the azimuth angle or the direction of arrival (DOA). In some embodiments the association of depth to the direction of arrival (azimuth) for each column of image pixel or regions can be performed using a mean or median depth value for the column group.

The operation of associating the depth map with an azimuth angle based on the field of view and zoom is shown in FIG. 4 by step 305.

The associator 205 can in some embodiments be configured to output a value of visual depth as a function of the azimuth angle or direction of arrival angle. In some embodiments it would be appreciated or understood that the function of visual depth with respect to the azimuth angle is a discrete function with regards to regions or ranges of azimuth angles.

The associator 205 can thus output a series of visual depth map values for direction of arrivals to the focus processor.

The operation of outputting the visual depth over the direction of arrival (or azimuth angle range) to the focus processor is shown in FIG. 4 by step 307.

Figure 5:
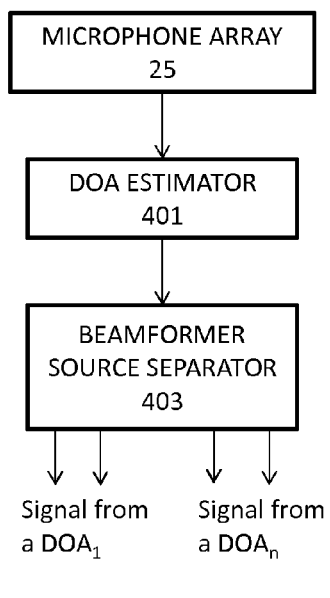
FIG. 5 shows schematically an audio capture and direction processor subsystem as shown in FIG. 2 according to some embodiments.

With respect to FIG. 5 an example audio capture and direction processor subsystem 103 is shown in further detail. Furthermore with respect to FIG. 6 the operation of the example audio capture and directions processor subsystem 103 is described.

The audio capture and direction processor subsystem 103 in some embodiments comprises a microphone array 25. As described herein the microphone array can be configured to record or capture the acoustic energy or audio field surrounding the apparatus and generate a suitable electronic representation of the audio field. Thus in some embodiments the microphone array 25 as described herein generates digital audio signals which can be passed to the direction of arrival estimator 401.

Figure 6:
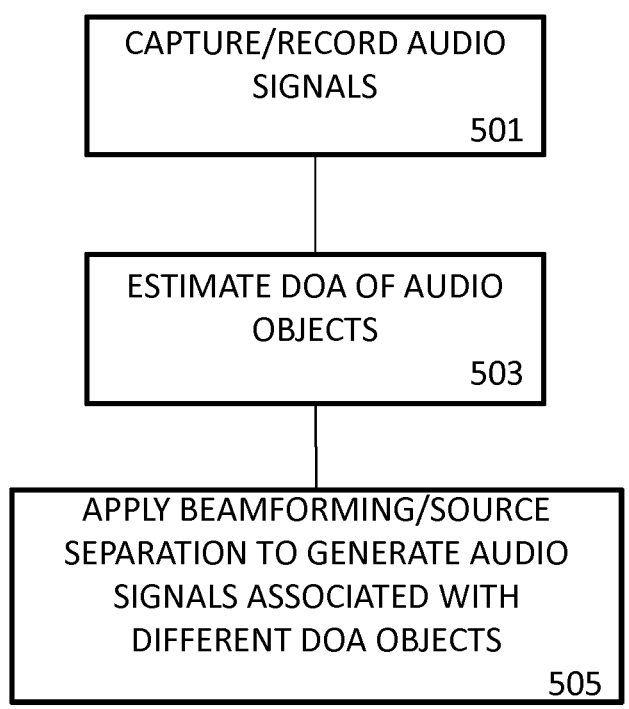
FIG. 6 shows a flow diagram of the operation of the audio capture and direction processor subsystem as shown in FIG. 2 according to some embodiments.

The operation of capturing/recording audio signals is shown in FIG. 6 by step 501.

In some embodiments the audio capture and direction processor subsystem 103 comprises a direction of arrival estimator or suitable means for determining a direction of arrival estimation 401 configured to receive the audio signals from the microphone array 25 and process the audio signals to determine estimates of audio objects and their direction of arrival. The estimation of the direction of arrival of audio objects can be performed using any suitable method.

An example directional object estimation is described as follows. However it would be understood that any audio signal directional processing in either the time or other representational domain (frequency domain etc.) can be used.

In some embodiments the direction of arrival estimator 401 comprises a framer. The framer or suitable framer means can be configured to receive the audio signals from the microphones and divide the digital format signals into frames or groups of audio sample data. In some embodiments the framer can furthermore be configured to window the data using any suitable windowing function. The framer can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer can be configured to output the frame audio data to a Time-to-Frequency Domain Transformer.

In some embodiments the direction of arrival estimator 401 comprises a Time-to-Frequency Domain Transformer. The Time-to-Frequency Domain Transformer or suitable transformer means can be configured to perform any suitable time-to-frequency domain transformation on the frame audio data. In some embodiments the Time-to-Frequency Domain Transformer can be a Discrete Fourier Transformer (DFT). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer can be configured to output a frequency domain signal for each microphone input to a sub-band filter.

In some embodiments the direction of arrival estimator 401 comprises a sub-band filter. The sub-band filter or suitable means can be configured to receive the frequency domain signals from the Time-to-Frequency Domain Transformer for each microphone and divide each microphone audio signal frequency domain signal into a number of sub-bands.

The sub-band division can be any suitable sub-band division. For example in some embodiments the sub-band filter can be configured to operate using psychoacoustic filtering bands. The sub-band filter can then be configured to output each domain range sub-band to a direction analyser.

In some embodiments the direction of arrival estimator 401 can comprise a direction analyser. The direction analyser or suitable means can in some embodiments be configured to select a sub-band and the associated frequency domain signals for each microphone of the sub-band.

The direction analyser can then be configured to perform directional analysis on the signals in the sub-band. The directional analyser can be configured in some embodiments to perform a cross correlation between the microphone/decoder sub-band frequency domain signals within a suitable processing means.

In the direction analyser the delay value of the cross correlation is found which maximises the cross correlation of the frequency domain sub-band signals. This delay can in some embodiments be used to estimate the angle or represent the angle from the dominant audio signal source for the sub-band. This angle can be defined as α. It would be understood that whilst a pair or two microphones can provide a first angle, an improved directional estimate can be produced by using more than two microphones and preferably in some embodiments more than two microphones on two or more axes.

The directional analyser can then be configured to determine whether or not all of the sub-bands have been selected. Where all of the sub-bands have been selected in some embodiments then the direction analyser can be configured to output the directional analysis results. Where not all of the sub-bands have been selected then the operation can be passed back to selecting a further sub-band processing step.

The above describes a direction analyser performing an analysis using frequency domain correlation values. However it would be understood that the object detector and separator can perform directional analysis using any suitable method. For example in some embodiments the object detector and separator can be configured to output specific azimuth-elevation values rather than maximum correlation delay values. Furthermore in some embodiments the spatial analysis can be performed in the time domain.

In some embodiments this direction analysis can therefore be defined as receiving the audio sub-band data;

$$X_k^b(n)=X_k(n_b+n), n=0,\ldots,n_{b+1}-n_b-1, b=0,\ldots,B-1$$

where $n_b$ is the first index of bth subband. In some embodiments for every subband the directional analysis as described herein as follows. First the direction is estimated with two channels. The direction analyser finds delay $\tau_b$ that maximizes the correlation between the two channels for subband b. DFT domain representation of e.g. $X_k^b(n)$ can be shifted $\tau_b$ time domain samples using $$X_{k,\tau_b}^b(n) = X_k^b(n)e^{-j\frac{2\pi n \tau_b}{N}}.$$

The optimal delay in some embodiments can be obtained from $$\max_{\tau_b} \text{Re}\left(\sum_{n=0}^{n_{b+1}-n_b-1} \left(X^b_{2,\tau_b}(n)^* X^b_3(n)\right)\right), \tau_b \in [-D_{tot}, D_{tot}]$$

where Re indicates the real part of the result and * denotes complex conjugate. $X^b_{2,\tau_b}$ and $X^b_3$ are considered vectors with length of $n_{b+1}-n_b$ samples. The direction analyser can in some embodiments implement a resolution of one time domain sample for the search of the delay.

In some embodiments the object detector and separator can be configured to generate a sum signal. The sum signal can be mathematically defined as.

$$X^b_{sum} = \begin{cases} (X^b_{2,\tau_b} + X^b_3)/2 & \tau_b \leq 0 \\ (X^b_2 + X^b_{3,-\tau_b})/2 & \tau_b > 0 \end{cases}$$

In other words the object detector and separator (or suitable means for object detection or separation) is configured to generate a sum signal where the content of the channel in which an event occurs first is added with no modification, whereas the channel in which the event occurs later is shifted to obtain best match to the first channel.

It would be understood that the delay or shift $\tau_b$ indicates how much closer the sound source is to one microphone (or channel) than another microphone (or channel). The direction analyser can be configured to determine actual difference in distance as $$\Delta_{23} = \frac{v\tau_b}{F_s}$$

where Fs is the sampling rate of the signal and v is the speed of the signal in air (or in water if we are making underwater recordings).

The angle of the arriving sound is determined by the direction analyser as, $$\dot\alpha_b = \pm\cos^{-1}\left(\frac{\Delta^2_{23} + 2b\Delta_{23} - d^2}{2db}\right)$$

where d is the distance between the pair of microphones/channel separation and b is the estimated distance between sound sources and nearest microphone. In some embodiments the direction analyser can be configured to set the value of b to a fixed value. For example b=2 meters has been found to provide stable results.

It would be understood that the determination described herein provides two alternatives for the direction of the arriving sound as the exact direction cannot be determined with only two microphones/channels.

In some embodiments the object detector and separator can be configured to use audio signals from a third channel or the third microphone to define which of the signs in the determination is correct. The distances between the third channel or microphone and the two estimated sound sources are:

$$\delta_b^+ = \sqrt{(h+b\sin(\dot\alpha_b))^2 + (d/2 + b\cos(\dot\alpha_b))^2}$$

$$\delta_b^- = \sqrt{(h-b\sin(\dot\alpha_b))^2 + (d/2 + b\cos(\dot\alpha_b))^2}$$

where h is the height of an equilateral triangle (where the channels or microphones determine a triangle), i.e.

$$h = \frac{\sqrt{3}}{2}d.$$

The distances in the above determination can be considered to be equal to delays (in samples) of;

$$\tau_b^+ = \frac{\delta^+ - b}{v}F_s$$

$$\tau_b^- = \frac{\delta^- - b}{v}F_s$$

Out of these two delays the object detector and separator in some embodiments is configured to select the one which provides better correlation with the sum signal. The correlations can for example be represented as $$c_b^+ = \text{Re}\left(\sum_{n=0}^{n_{b+1}-n_b-1} \left(X^b_{sum,\tau_b^+}(n)^* X^b_1(n)\right)\right)$$

$$c_b^- = \text{Re}\left(\sum_{n=0}^{n_{b+1}-n_b-1} \left(X^b_{sum,\tau_b^-}(n)^* X^b_1(n)\right)\right)$$

The object detector and separator can then in some embodiments then determine the direction of the dominant sound source for subband b as:

$$\alpha_b = \begin{cases} \dot\alpha_b & c_b^+ \geq c_b^- \\ -\dot\alpha_b & c_b^+ < c_b^- \end{cases}$$

In some embodiments the object detector and separator further comprises a mid/side signal generator. The main content in the mid signal is the dominant sound source found from the directional analysis. Similarly the side signal contains the other parts or ambient audio from the generated audio signals. In some embodiments the mid/side signal generator can determine the mid M and side S signals for the sub-band according to the following equations:

$$M^b = \begin{cases} (X^b_{2,\tau_b} + X^b_3)/2 & \tau_b \leq 0 \\ (X^b_2 + X^b_{3,-\tau_b})/2 & \tau_b > 0 \end{cases}$$

$$S^b = \begin{cases} (X^b_{2,\tau_b} - X^b_3)/2 & \tau_b \leq 0 \\ (X^b_2 - X^b_{3,-\tau_b})/2 & \tau_b > 0 \end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. The mid and side signals can be determined in such a manner in some embodiments is suitable where the microphones are relatively close to each other. Where the distance between the microphones is significant in relation to the distance to the sound source then the mid/side signal generator can be configured to perform a modified mid and side signal determination where the channel is always modified to provide a best match with the main channel.

The operation of estimating the direction of arrival of audio objects is shown in FIG. 6 by step 503.

The direction of arrival estimates, for example as indicated above the direction $\square_b\square$ dominant sound source for subband b, can in some embodiments be passed to a beamformer source separator 403.

In some embodiments the audio capture and direction processor subsystem 103 comprises a beamformer source separator 403. The beamformer source separator is configured to receive the direction of arrival estimate values and generate a suitable signal or signal representations of the audio signals from each direction of arrival.

In some embodiments the direction of arrival signal can be generated by using for a given direction (or range or region) the side signal S for the sub-bands where no signal object is determined and the mid signal M for the sub-bands where the object matches the direction (or is within the range or region).

However it would be understood that in some embodiments any spatial audio processing on the received audio signals based on the detected object directions can be performed.

The beamformed signals from each direction of arrival can then be passed to the audio focus processor 105.

The application of beamforming/source separation to generate audio signals associated with different direction of arrivals is shown in FIG. 6 by step 505.

Figure 8:
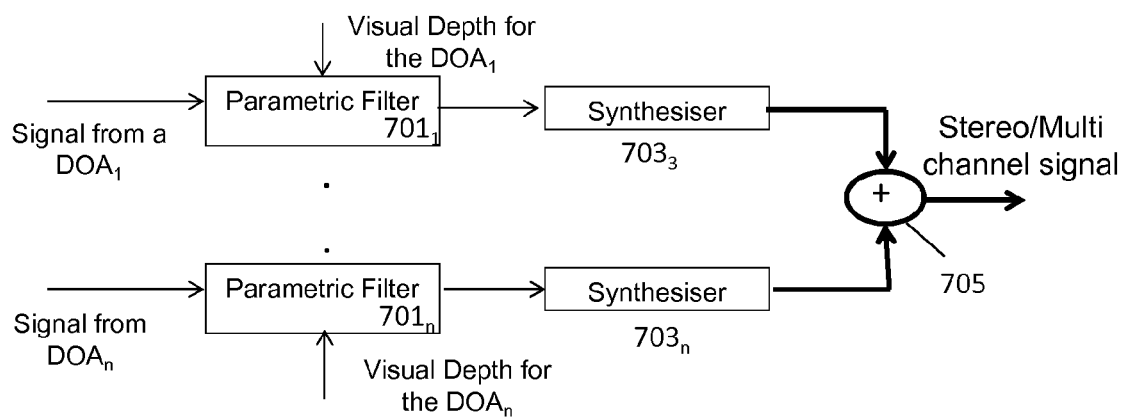
FIG. 8 shows schematically an audio focus processor subsystem as shown in FIG. 2 according to some embodiments.

With respect to FIG. 8 an example audio focus processor 105 is shown in further detail. Furthermore with respect to FIG. 9 the operation of the example audio focus processor is described.

In some embodiments the audio focus processor 105 or suitable audio signal processing means comprises a bank of parametric filters 701. In the example shown in FIG. 8 there is a parametric filter for each of the direction of arrival ranges or regions. However it would be understood that in some embodiments this parallel operation can be converted into a suitable serial or partial serial configuration. In the example shown in FIG. 8 a first parametric filter $701_1$ is configured to receive the audio signal from the first direction of arrival or azimuth range $DOA_1$ and the visual depth value for the direction of arrival or azimuth angle ($DOA_1$). Similarly the nth parametric filter $701_n$ receives the audio signal from the nth azimuth and region or direction of arrival ($DOA_n$) and the visual depth value for the same direction of arrival region ($DOA_n$).

Figure 9:
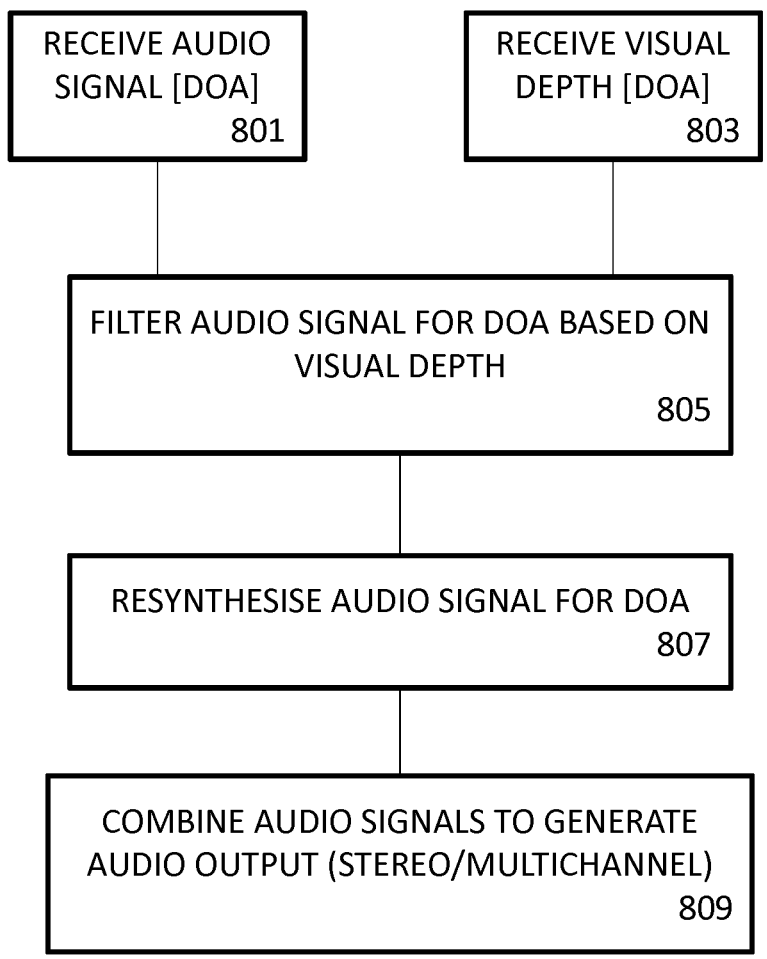
FIG. 9 shows a flow diagram of the operation of the audio processor subsystem as shown in FIG. 2 according to some embodiments.

The operation of receiving the audio signal is shown in FIG. 9 by step 801.

Furthermore the operation of receiving the visual depth value is shown in FIG. 9 by step 803.

The parametric filter is an example of a kernel operation on the audio signal however it would be understood that in some embodiments the parametric filter of filterbank can be replaced by nonparametric filterbank or any suitable operation on the audio signal based on the visual depth value.

Furthermore in the following examples the parametric filter operation performed is one of reverberation. In some embodiments the selection of filter parameters can be achieved using a user interface input to select a direction on an image displayed to select a direction of arrival or azimuth to remain in focus. In some embodiments the optical processing of the image can render image data other than the image data for that visual depth visually out of focus. Furthermore as described herein the kernel operation can then process the audio signals such that the audio signals which have the visual depth value similar to the visual depth value of the azimuth or direction of arrival or region selected are processed the least or not at all (in other words a direct signal output) and the audio signals which have a visual depth value different from the visual depth value of the azimuth or direction of arrival or region selected are processed (in the example provided here a reverb signal added). It would be understood that any user interface input can be used. For example a slider, dial (either mechanical or virtual on the user interface) can be used to change the 'focal' distance.

The operation of filtering the audio signal for each direction of arrival or azimuth range based on the visual depth value is shown in FIG. 9 by step 805.

The output filtered value can then be passed to a synthesiser.

In some embodiments the audio focus processor 105 comprises a bank of synthesizers 703 or suitable synthesizing means. In the example shown in FIG. 8 each filtered output is passed to a synthesiser thus the output of the first parametric filter $701_1$ is passed to a first synthesiser $703_1$, and the output of the nth parametric filter $701_n$ is passed to a nth synthesiser $703_n$. However it would be understood that in some embodiments a serial (or hybrid serial-parallel) representation similar to that as described herein with regards to the parametric filter serialization (or hybrid serial-parallel implementation) can be performed.

The synthesiser 703 can be configured to receive the filtered or processed audio signal based on the depth for each direction of arrival and synthesise a suitable binaural or multichannel synthesis audio signal. In the example shown herein the synthesis is one of a binaural synthesis where the direct signals are convolved with left and right Head Related Impulse Response (HRIR) filters to impart inter-time difference and inter-level differences cues. The output of the synthesiser 703 can be passed to a combiner 705. However it would be understood that any multichannel synthesis can be performed, for example 5.1, 7.1 or 9.1 channel synthesis.

The operation of synthesising or re-synthesising the audio signal based on the direction of arrival value is shown in FIG. 9 by step 807.

In some embodiments the audio focus processor 105 comprises a combiner 705 (or suitable means for combining) configured to combine the output of each synthesiser 703 to generate a combined stereo or multichannel signal.

The operation of combining the audio signals to generate an audio output such as a stereo or multichannel signal is shown in FIG. 9 by step 809.

Thus in summary an example operation of focus is:

Let $d_k$ be the depth of interest

Let the depth for a particular DOA be $d_j$ (normalized depth in grey level 0:1, 1 indicates object being at infinity. The depth is usually estimated as 0:255, but in some embodiments it is normalized with 255 to bring it into the range 0:1)

The output of the beamformer source separator from a particular DOA, $\theta_j$, can be defined as $s_j$ The output of the parametric filter 701 can be a reverbed signal from $s_j$ for left and right ears
$r_j^L$ and $r_j^R$ (decorrelated from each other)
$r_j^L = s_j *$reverb filter
$r_j^R = s_j *$reverb filter
The reverb filter can be defined by
gain on reverb signal=(plot of gain shown in FIGS. 10 and 11 for two values of $d_k$)
if $(d_j < d_k)$
$a_j = (d_j + 1)(d_k - d_j)$
else
$a_j = (d_j - d_k)/d_j$
end
gain on direct signal=$b_j = 1 - a_j$ The synthesiser can in some embodiments for binaural synthesis take the direct signals and convolve with left and right HRIR filters to impart ITD and ILD cues
$s_j^L = s_j * hrir^L(\theta_j)$
$s_j^R = s_j * hrir^R(\theta_j)$ Thus the left and right channels for each filter and synthesiser output are
$o_j^L = b_j \times s_j^L + a_j \times r_j^L$
$o_j^R = b_j \times s_j^R + a_j \times r_j^R$ The output of the combiner therefore is
$O^L = \Sigma o_j^L$
$O^R = \Sigma o_j^R$ In some embodiments the audio source object is occluded by some other object in front of the audio object. In such situations as there is no audio depth information, it may not be possible to estimate the true audio object depth. Furthermore in video refocus type applications, the user cannot choose occluded objects. So even if the audio depth were known precisely, the user would be unable to select/choose a particular object based on visual information. However in both situations the application of vertical strip (column of pixels) averaging of objects at different depths, for example by associating depth to DOA based on either the central row or median or mean depth of pixels in that column and switching between these can attempt to overcome these possible problems.

Figure 12:
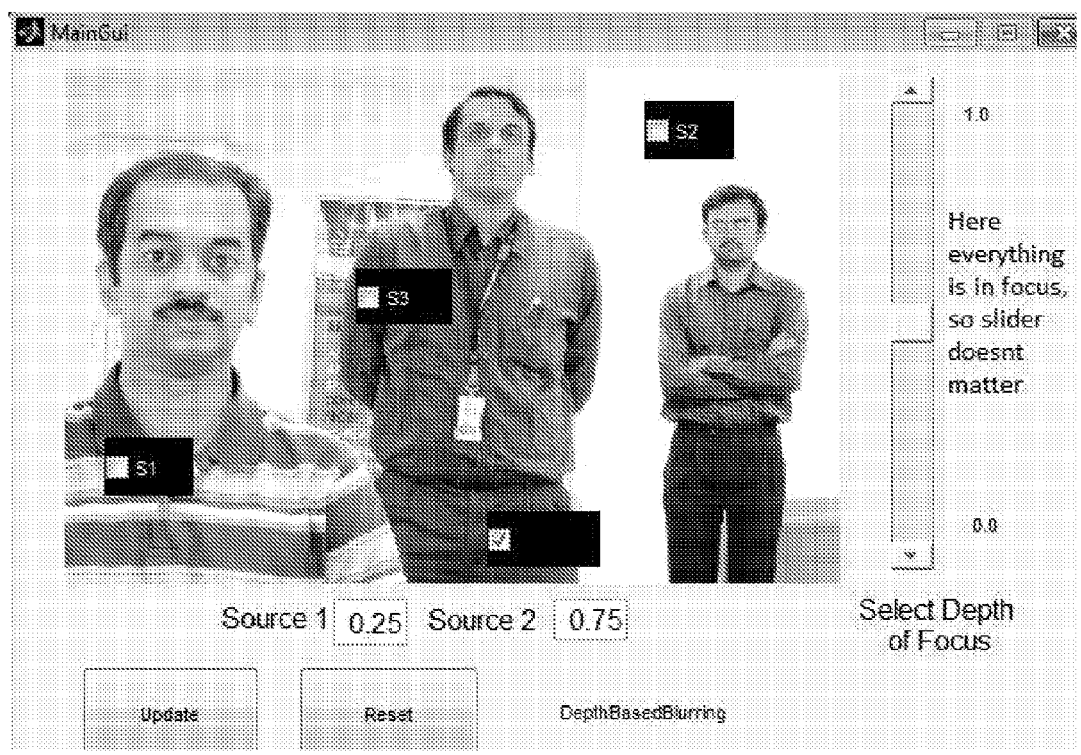
FIGS. 12 to 14 show example demonstrations of depth of focus on directionally associated audio sources.
Figure 13:
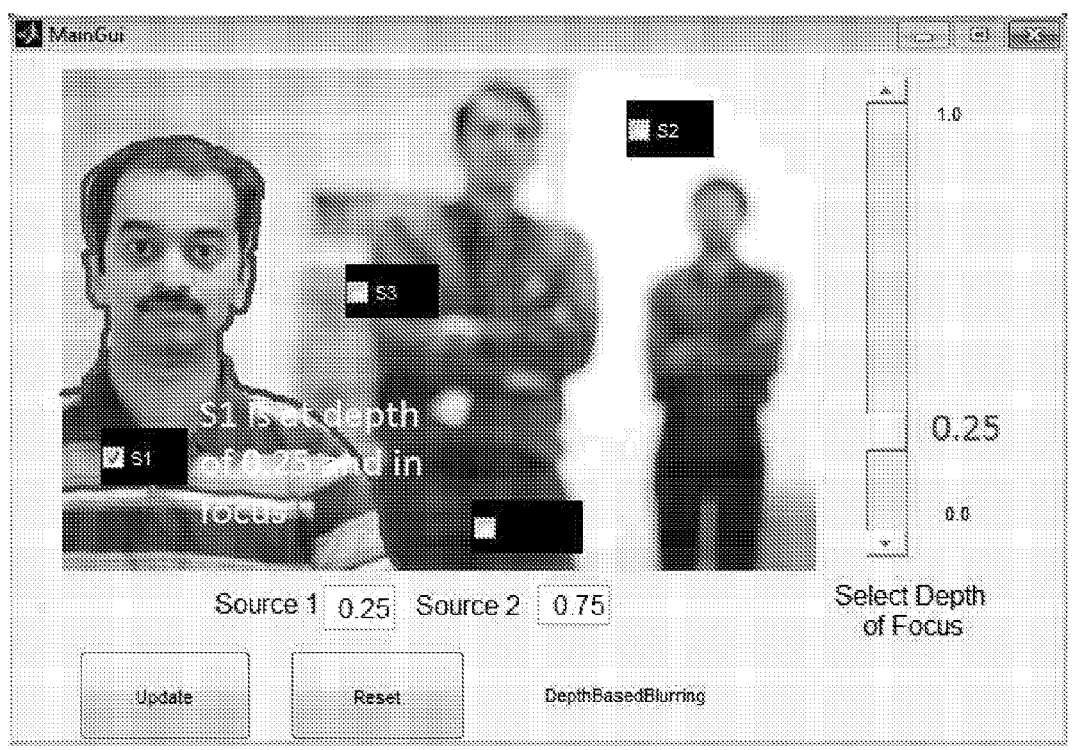
Figure 14:
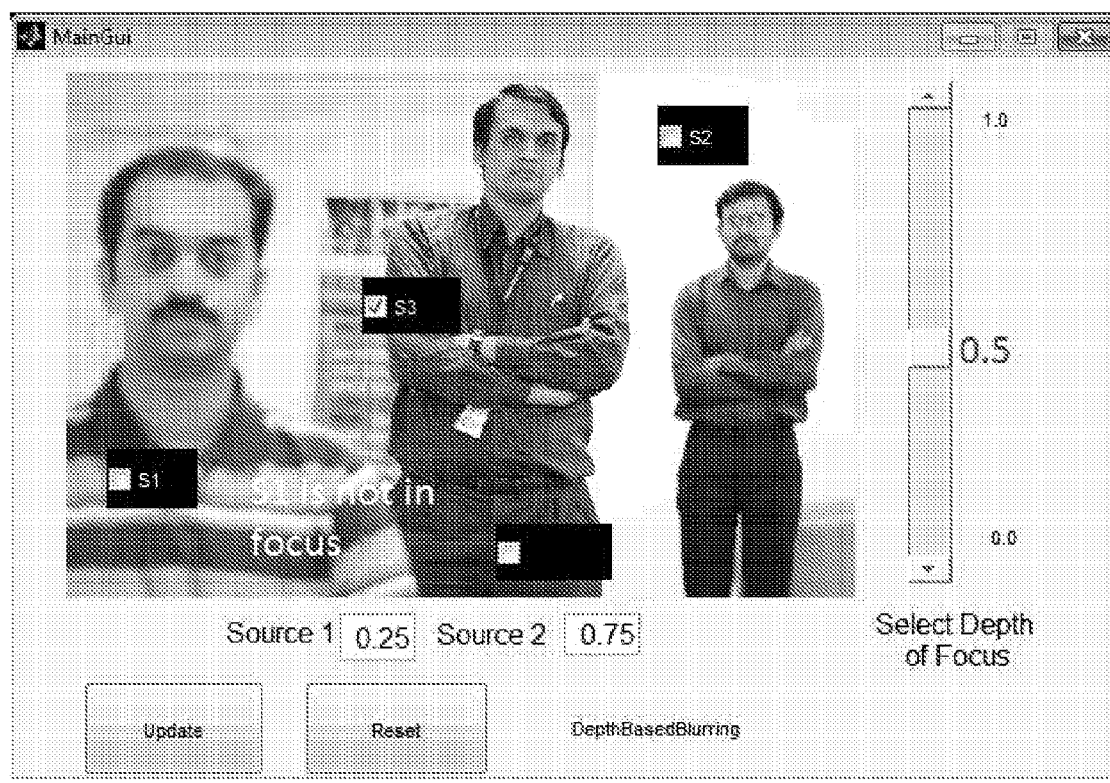

With respect to FIGS. 12 to 14 an example demonstration application to highlight the features described herein are shown. The images shown in FIGS. 12 to 14 were captured using a plenoptic camera. These were then processed to generate images with focus at different depths. The audio signal used in the demonstration was a simulated capture from a uniform linear array of 3-microphones with a separation of 5 cm. This audio is processed based on the depth.

FIG. 12 shows the GUI for the demonstration application. The image shown in FIG. 12 is fully focused (all the three talkers in scene at different depths are in focus). The direction of arrival of audio wavefronts from the girl S1 is about −30 degrees to the front left. The depth map indicates that visual object at −30 degrees is at a depth of 0.25. If the intent is to keep this talker in focus, the end user moves the slider on the right to about 0.25.

FIG. 13 shows the GUI for the demonstration application where the end user has moved the slider on the right to about 0.25. In such an example demonstration the binaural audio synthesized in this case has the signal arriving from DOA of −30 as is without any modification.

FIG. 14 shows the GUI for the demonstration application where the end user has moved the slider on the right to about 0.5, indicating that they want to focus at a depth of 0.5. As can be seen in FIG. 14 S1 is no longer in focus in the image. As the depth at DOA of −30 is not equal to desired depth of 0.5, the audio signal incident from −30 degrees is filtered through a reverberation filter. The direct to reverb ratio is a function of the depth of S1 and the desired depth of focus 0.5. The gains from plots in FIG. 11 are used to control the direct to reverb ratio. The result of this filtering is that one cannot associate a spatial direction to the audio signal incident from S1, essentially creating a spatial blur. A perceptual synchronization between the blur in the image and spatial blur in the audio is achieved.

The harmonic groups explained above are based on fundamental frequency of the source, but it may be based on any other principle of grouping and forming an audio object. For example computational auditory scene analysis provides various principles based on which human auditory system identifies auditory objects.

In some embodiments where the room or audio environmental characteristics are known the response at source locations can be accurately computed using acoustic principles and represented ultimately by a filter. The filter can be applied on the detected source in specific direction before the synthesis operation.

It should be understood that audio sources apart from the one selected by the user can also be processed based on the selection. For example in some embodiments the selected audio source is processed so that it is reproduced more clearly whereas the unselected audio sources are processed so that they are less significant. In other words the audio reproduction is controlled based on the user's interaction/selection.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:

(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

We claim:

1. An apparatus comprising:
a depth map estimator circuit configured to determine a depth map of a field of view comprising at least one visual image, the depth map comprising at least one distance value in a direction relative to the apparatus;
a direction of arrival circuit configured to determine, using at least two microphones, a direction of arrival of at least one audio source signal within the field of view, wherein the at least one audio source signal is associated with a feature within the at least one visual image, the feature being located at the at least one distance value; and
an audio signal circuit configured to process the at least one audio source signal based on the at least one distance value and the direction of arrival of the at least one audio source signal;
wherein the processing comprises focusing the feature at the at least one distance value.

2. The apparatus as claimed in claim 1, wherein the depth map estimator circuit configured to determine at least one of:
a depth map from at least two images;
a depth map from a depth sensor and at least one image; and
a depth map from a lightfield camera.

3. The apparatus as claimed in claim 1, wherein the direction of arrival circuit comprises:
an input configured to receive at least two audio signals from the at least two microphones;
an audio source determiner configured to determine based on the at least two audio signals at least one audio source;
an audio source direction determiner configured to determine the direction of arrival of the at least one audio source; and
a source separator configured to generate based on the at least one audio source and the at least one audio source direction the at least one audio source signal.

4. The apparatus as claimed in claim 1, wherein the audio signal circuit comprises at least one of the below, configured to process the at least one audio source signal:
a filter configured to filter the at least one audio source signal based on the distance value;
an amplifier configured to amplify the at least one audio source signal based on the distance value;
an attenuator configured to attenuate the at least one audio source signal based on the distance value;
a parametric filter configured to parametrically filter the at least one audio source signal based on the distance value;
a non-parametric filter configured to non-parametrically filter the at least one audio source signal based on the distance value;
a pitch shifter configured to pitch shift the at least one audio source signal based on the distance value;
a time varying processor configured to time varying process the at least one audio source signal based on the distance value;
a non-linear processor configured to non-linear process the at least one audio source signal based on the distance value; and
reverberation processor configured to reverberation process the at least one audio source signal based on the distance value.

5. The apparatus as claimed in claim 1, wherein the depth map estimator circuit configured to determine a plurality of distance values in directions relative to the apparatus;
the direction of arrival determiner configured to determine directions of arrival of a plurality of audio source signals within the field of view; and
the audio signal processor configured to process each of the plurality of audio source signals based on the at least one distance value and the direction of arrival.

6. The apparatus as claimed in claim 1, further comprises an audio synthesiser configured to synthesise a multichannel audio signal from the at least one audio source signal based on the at least one distance value.

7. The apparatus as claimed in claim 6, further comprises a combiner configured to combine the multichannel audio signal synthesised from each of the processed plurality of audio source signals.

8. The apparatus as claimed in claim 1, wherein the at least one audio source signal is associated with a feature within the at least one visual image, the feature is located at the at least one distance value, and wherein the apparatus further comprises a visual image processor configured to process the feature.

9. The apparatus as claimed in claim 8, wherein the processing comprises one of:
  focusing the feature at the at the at least one distance value, and defocusing for other distance values; or
  defocusing the feature at the at least one distance value.

10. The apparatus as claimed in claim 1, wherein the apparatus further comprises:
  a display configured to display the at least one visual image; and wherein the audio signal processor configured to:
  receive a selection input from the at least one visual image on the display; and
  process the at least one audio source signal based on the received selection input.

11. A method comprising:
  determining, with a depth map estimator circuit, a depth map of a field of view comprising at least one visual image, the depth map comprising at least one distance value in a direction relative to the apparatus;
  determining, with a direction of arrival circuit, using at least two microphones, a direction of arrival of at least one audio source signal within the field of view, wherein the at least one audio source signal is associated with a feature within the at least one visual image, the feature being located at the at least one distance value; and
  processing, with an audio signal circuit, the at least one audio source signal based on the at least one distance value and the direction of arrival of the at least one audio source signal;
  wherein the processing comprises focusing the feature at the at least one distance value.

12. The method as claimed in claim 11, wherein determining a depth map comprises at least one of:
  determining a depth map from at least two images offset relative to each other;
  determining a depth map from a depth sensor and at least one image; and
  determining a depth map from a lightfield camera.

13. The method as claimed in claim 11, wherein determining at least one audio source signal with a direction comprises:
  receiving at least two audio signals from at least two microphones;
  determining based on the at least two audio signals at least one audio source, and a direction of arrival of the at least one audio source; and
  generating based on the at least one audio source and the at least one audio source direction the at least one audio source signal with a direction.

14. The method as claimed in claim 11, wherein processing the at least one audio source signal comprises at least one of the below, configured to process the at least one audio source signal:
  filtering the at least one audio source signal based on the at least one distance value;
  amplifying the at least one audio source signal based on the at least one distance value;
  attenuating the at least one audio source signal based on the at least one distance value;
  parametrically filtering the at least one audio source signal based on the at least one distance value;
  non-parametrically filtering the at least one audio source signal based on the at least one distance value;
  pitch shifting the at least one audio source signal based on the at least one distance value;
  time varying processing the at least one audio source signal based on the at least one distance value;
  non-linear processing of the at least one audio source signal based on the at least one distance value; and
  reverberation processing the at least one audio source signal based on the at least one distance value.

15. The method as claimed in claim 11, wherein determining, associated with at least one visual image, a depth map comprising at least one distance value in a direction relative to the apparatus comprises:
  determining a plurality of distance values in directions relative to the apparatus;
  determining, using at least two microphones, directions of arrival of a plurality of audio source signals with directions; and
  processing the at least one audio source signal based on the at least one distance value comprises processing each of the plurality of audio source signals with directions based on the at least one distance value and the direction of arrival.

16. The method as claimed in claim 11, further comprising synthesising a multichannel audio signal from the at least one audio source signal processed based on the at least one distance value in the direction of the at least one audio source signal.

17. The method as claimed in claim 11, wherein the at least one audio source signal with a direction is associated with a feature within the at least one visual image, the feature being located at the at least one distance value, the method further comprising processing the feature.

18. The method as claimed in claim 17, wherein processing the feature comprises one of:
  focusing the feature at the at least one distance value, and defocusing for other distance values; or
  defocusing the feature at the at least one distance value.

19. The method as claimed in claim 11, further comprising:
  displaying on a display the at least one visual image; and wherein processing the at least one audio source signal based on the at least one distance value comprises:
  selecting the direction relative to the apparatus on the at least one visual image on the display; and
  processing the at least one audio source signal in the selected direction.

20. A computer program product comprising program instructions to cause an apparatus to perform method as claimed in claim 11.

* * * * *